C. G. ALLGRUNN.
RIFLING MACHINE.
APPLICATION FILED OCT. 1, 1918.
1,311,584.
Patented July 29, 1919.
2 SHEETS—SHEET 1.
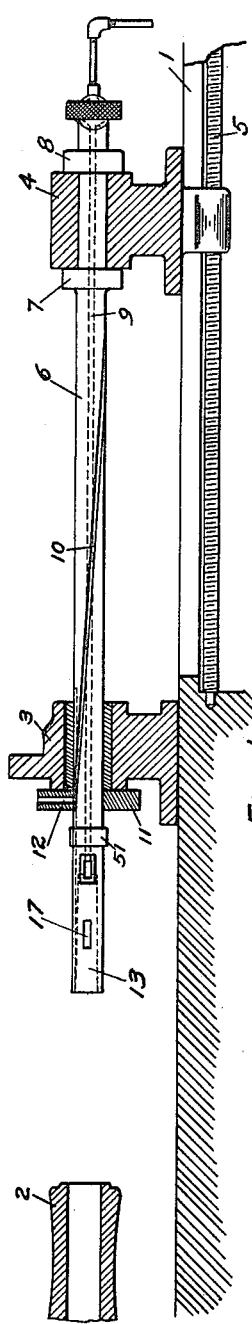
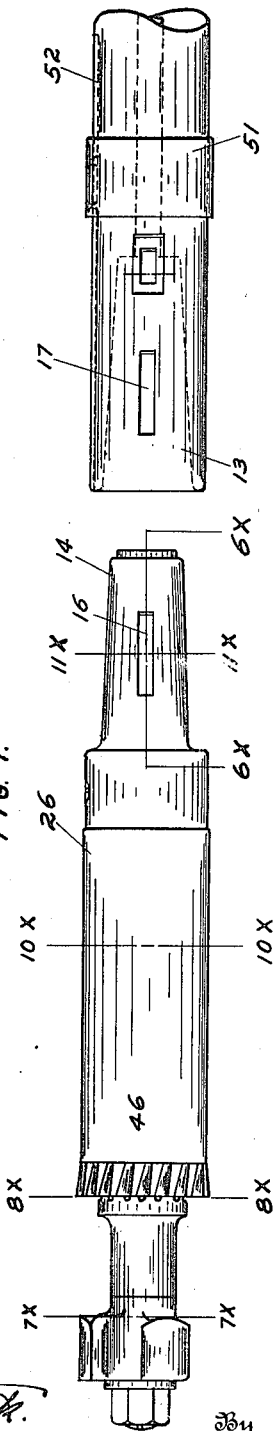
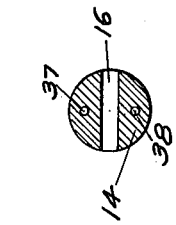
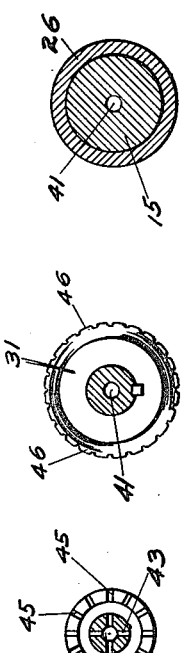
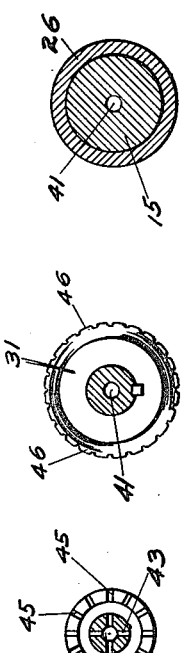
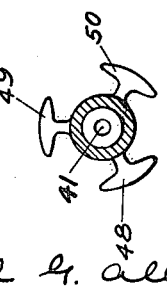

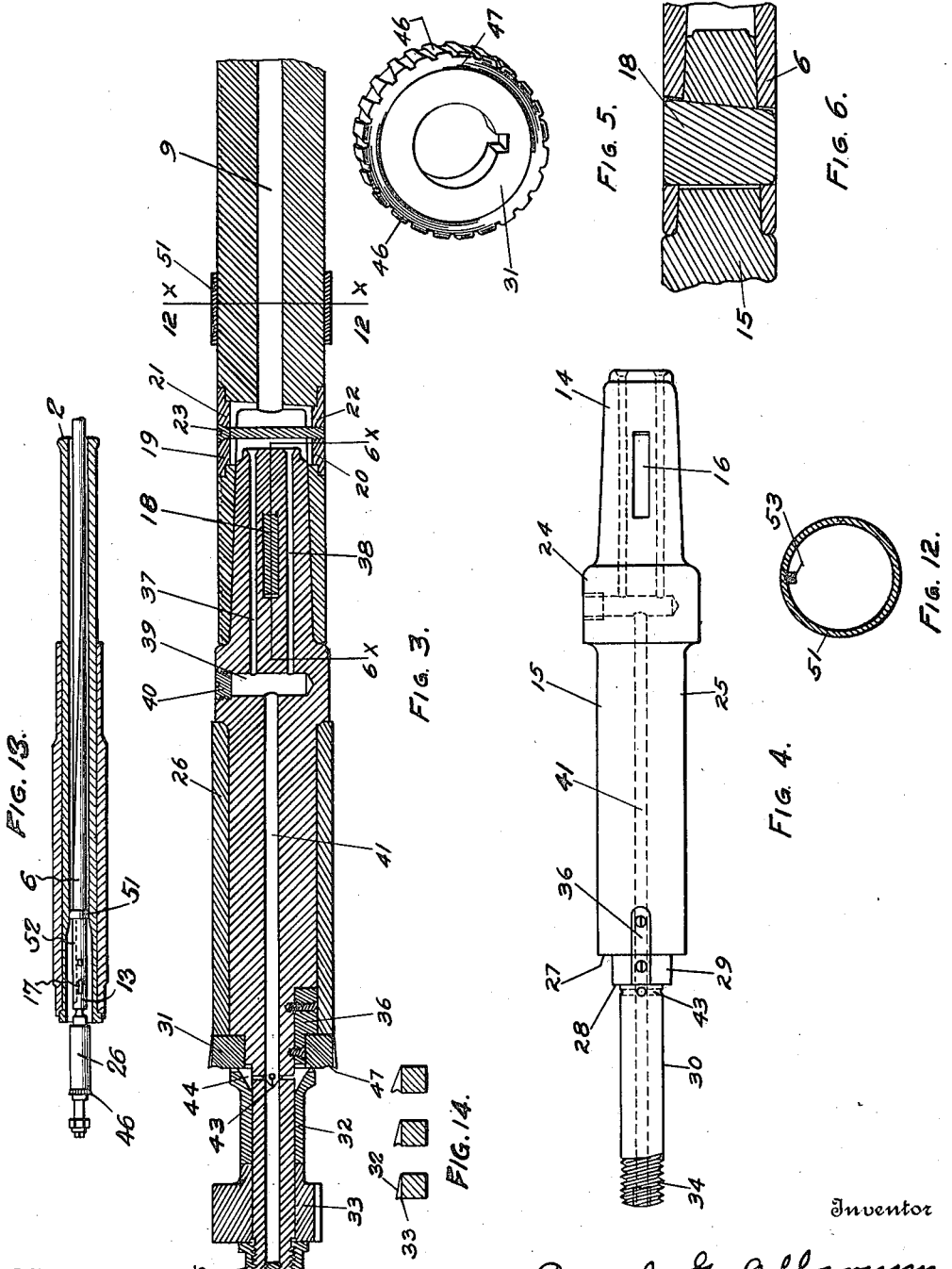

UNITED STATES PATENT OFFICE.

CARL G. ALLGRUNN, OF ROCHESTER, NEW YORK.

RIFLING-MACHINE.

1,311,584.         Specification of Letters Patent.      Patented July 29, 1919.

Application filed October 1, 1918. Serial No. 256,466.

*To all whom it may concern:*

Be it known that I, CARL G. ALLGRUNN, a citizen of the United States, residing at Rochester, in the county of Monroe and State of New York, have invented certain new and useful Improvements in Rifling-Machines, of which the following is a specification.

This invention relates to a tool for cutting the rifling grooves in gun barrels and its object is to provide a new and improved tool and a new method or process of using it by which the rifling of a gun barrel is simplified and the time for performing this operation is greatly reduced.

This and other objects of the invention will be fully illustrated in the drawings, described in the specification and pointed out in the claims at the end thereof.

In the drawings:

Figure 1 is a diagrammatic view of a rifling machine.

Fig. 2 is a side elevation of my improved rifling tool and the end of the rifling bar containing the socket therefor, the tool being shown separate from the rifling bar.

Fig. 3 is a sectional view through the rifling tool and the rifling bar assembled, the rifling bar being partly broken away.

Fig. 4 is a side elevation of the shank of the rifling tool.

Fig. 5 is a perspective view of the last cutter of the series.

Fig. 6 is a section on the line $6^x$—$6^x$ of Figs. 2 and 3.

Fig. 7 is a section through the pilot on the line $7^x$—$7^x$ of Fig. 2.

Fig. 8 is a section on the line $8^x$—$8^x$ of Fig. 2, looking to the left.

Fig. 9 is a section on the line $8^x$—$8^x$ of Fig. 2, looking to the right.

Fig. 10 is a section on the line $10^x$—$10^x$ of Fig. 2.

Fig. 11 is a section on the line $11^x$—$11^x$ of Fig. 2.

Fig. 12 is a cross section of the sleeve 51 on the line $12^x$—$12^x$ of Fig. 3.

Fig. 13 is a diagrammatical view showing the tool and cutter at the end of the stroke.

Fig. 14 shows cross-sections through three different broaches of one series.

In the drawings, like reference numerals indicate like parts in the several figures.

Gun barrels are rifled for the purpose of giving greater accuracy of fire. This rifling consists of a string of parallel grooves, running spirally along the inside of the barrel. The cutting of these rifling grooves is the subject of my invention. The rifling operation has heretofore been done by means of a tool which is provided with two cutting edges that are placed diametrically opposite each other on the rim of the tool holder, each of which cutting edges cuts a single groove so that two of the spiral grooves are cut at a time by the machine. If the gun barrel contains 24 rifling grooves, 12 operations are necessary to make one cut in each of the 24 grooves. Each groove requires a number of cuts in order to make it the desired depth. In a 3" gun about 24 cuts are necessary in each groove to bring it to the desired depth so that in all 12 times 24, or 288, cuts are necessary to complete the rifling operation of a 3" gun barrel having 24 grooves therein.

In some cases three or even four cutting edges have been used at a time, but in any case the total number of cutting edges used simultaneously has never been more than a small fraction of the total number of grooves to be cut in the barrel.

With larger guns the number of grooves cut are greater in number.

The location of the cutting tools for the different rifling grooves is changed by rotating the groove of the rifling bar for each change of grooves operated on, the cutting tools remaining stationary in the cutting head.

It has been customary for the cutting tool to take off a thin cut of one or two thousandths of an inch, and after each cut has been completed, it has been customary to advance the cutting edge radially so as to use the same cutting edge for successive cuts of increasing depth. It has been necessary after each cut is made, to draw the cutting edges in radially so that they will not come into contact with the gun barrel on the return movement of the tool holder. Failure to move the cutting edges in has caused the scoring and consequent loss of many gun barrels. The rifling operation is one of the last operations to be performed in the making of the gun barrel and the loss is, therefore, very great if the gun barrel is spoiled thereby because it means the loss of all the work previously done on the gun.

In rifling 3" or 75 mm. gun barrels by my invention but twelve cutting operations are necessary to complete the work. All of the rifling grooves are cut simultaneously and uniformly.

In the drawings, reference numeral 1 shows a rifling machine partly broken away, having a gun 2 mounted in place thereon. The machine is provided with a head stock 3 which is stationary and a tail stock 4 which is moved by the feed screw 5. Mounted in the head and tail stocks is the rifling bar 6. The rifling bar is mounted to slide in the head stock 3 and is held by the flanges 7 and 8 against sliding longitudinally in the tail stock 4 and moves therewith. The rifling bar is mounted to rotate in both the head stock and tail stock. The rifling bar is tubular as indicated at 9 to provide for the feed of oil therethrough. The rifling bar has a spiral groove 10 cut therein by which the bar is caused to rotate on its longitudinal movement forward and back. On the head stock 3 is provided a face plate 11, on which is provided a feather 12, which plate and feather are rigidly held on the head stock 3. The feather 12 engages with the groove 10 of the rifling bar and causes the bar to rotate as the bar passes the feather. Because all the grooves are cut at once, the groove of the rifling bar where it passes the feather does not have to be rotated between cuts as is necessary where but two or three grooves are cut at a time.

On the end of the rifling bar is provided a socket 13 to receive the tapered end 14 of the shank 15. The tapered end 14 is provided with a key way 16 and the socket is provided with the key way 17, which key ways line up with each other when the parts are brought together as shown in Figs. 3 and 6 so that they can receive and be held together by a key 18. This key, as appears from Fig. 6, lies flush with or inside of the periphery of the socket.

As appears from Figs. 2 and 3, the socket is somewhat longer than the tapered end 14 of the shank so that an open space is left between the end of the shank and the inner end of the socket. This open space serves two purposes; first, it answers as a pocket or reservoir for the distribution of oil from the rifling bar to the shank, and, second, it provides a clearance between the socket and the tapered end of the shank in which a drift may be inserted for the purpose of forcing the shank out of the socket and separating the two parts. To permit the use of the drift, the socket is slotted as indicated at slots 19 and 20. These slots are normally covered by plates 21 and 22, which plates are held in place by a screw 23. By removing the screw 23, the plates 21 and 22 may be removed and the drift may be inserted for the purpose of forcing the shank out of the pocket. The plates 21 and 22 make a tight fit with the socket so as to prevent the leak of oil therefrom while they are in position.

The shank 15 is provided with a flange 24, on one side of which is the tapered end 14 and on the other side of which is the cylindrical seat 25 adapted to receive the guide sleeve 26. The cylindrical seat 25 is shouldered at 27 and 28 to form the seats 29 and 30 thereon. On the seat 29 is received the cutter 31 and on the seat 30 is received the oil distributing sleeve 32 and the pilot 33, all of which appears in section in Fig. 3. The end of the seat 30 is threaded as indicated at 34 to receive a nut and washer 35, which nut and washer are made in one piece. This nut and washer clamp the guide sleeve 26, cutter 31, the oil distributing sleeve 32 and the pilot 33 on the seats and hold them rigidly between the flange 24 and the nut 35.

The seats 25 and 29 are recessed to receive the key 36, the upper surface of which at one end is stepped up to conform to the cylindrical surface of the seat 25 and is stepped down at the other end to engage in the key way in the cutting tool 31. The key 36 is held in place by two screws shown in Figs. 3 and 4.

The shank 15 is perforated longitudinally to provide for the distribution of oil therethrough. At the right hand end, as shown in Fig. 3, two passage ways are shown, 37 and 38, one on each side of the key way 16. In the flange 24 is provided a radial pocket 39, which is threaded at its outer end and is normally closed by a plug 40. The two passage ways 37 and 38 discharge into this pocket and from this pocket extending to the left is provided a passage way 41 located axially of the shank. This passage way extends to the end of the shank and is closed by a plug 42. This arrangement of the passage ways is provided so that they can be easily drilled from the opposite ends of the shank out of line with each other and connected by the pocket 39.

In the seat 30 is provided the radial openings 43, preferably four in number, which extend through the seat and communicate with the passage way 41 to permit the discharge of oil therethrough. Surrounding these openings is the enlarged or chamfered end 44 of the oil distributing sleeve 32, which provides a pocket surrounding the radial openings 43, into which the oil can be discharged from the passage way 41. The end of the oil distributing sleeve is provided with the radial grooves 45, 45 through which the oil is discharged from the pocket along the front face of the cutting tool 31.

The tool 31, which performs the cutting operation, comprises a circular disk which has the broaching teeth 46, 46 provided on the periphery thereof. These broaching teeth are slightly undercut at the front of the outer edge thereof, as appears in Fig. 3, by means of the circular groove 47, which is provided in the front face of the cutter adjoining the cutting edges of the broaching teeth.

On top the broaching teeth 46 taper toward the rear and slightly decrease in height. The front edge thereof forms a sharp cutting edge, the outline of which conforms to the grooves to be cut in the bore of the gun barrel. These broaching teeth have one side running straight back, substantially parallel to the axis of the cutter and the other side tapering toward it by an angle of about 9°, or a little more than the greatest pitch of the rifling groove to be cut thereby, which pitch is about 7° in a 75 millimeter gun.

The spaces provided between the broaching teeth 46 are deep enough so that the lands of the gun barrel will not be cut thereby at these points. The ridges or lands for the rifling are thus left in the barrel as the cutting tool passes through the bore of the gun and cuts the grooves between the lands.

A series of cutters 31 are used, preferably 12 in number, for a 3″ or 75 mm. gun each of which is slightly greater in diameter than the preceding one, Fig. 14, the body of the cutting tool in each case being of the same size, the difference being in the height of the cutting or broaching teeth. The broaching teeth in the first cutter are high enough to cut radially about two thousandths of an inch. Each succeeding cutter has its teeth slightly increased in height by about two thousandths of an inch up to and including the eighth cutter. The ninth, tenth, eleventh and twelfth cutters each have their cutting teeth increased radially about one thousandth of an inch, it being understood that the smallest cutter is the first to go through and the largest cutter is the last to go through the barrel. These cutters are used in succession, the smallest cutter going through first and then being removed from the shank, after which the shank is drawn back through the gun barrel and the next larger cutter is placed thereon, which cutter is removed and replaced successively by the other cutters after each has finished its cut, one cutter being used for each cutting operation. Each cutter goes forward through the barrel once and is taken off at the end of the forward stroke, after which the shank returns for the next cutter. The successive cutters are provided with the same kind of a key way placed in the same relative position with regard to the cutting teeth and are all held in the same position by the same key 36.

On the left hand end of the shank, as shown in Figs. 2 and 3, is provided the pilot 33, which is provided with three segmental guiding shoes 48, 49 and 50, which are suitably spaced apart on the periphery thereof having open spaces between them. The outside diameter of the pilot corresponds to the inside diameter of the gun barrel which is to be rifled and engages with and is held centrally in line therewith and makes a close sliding fit therewith and serves to guide the cutting tool through the gun barrel and properly centers it therein before it enters the mouth of the gun barrel.

The central portion of the shank 15 is surrounded by the guide sleeve 26, which corresponds in diameter to and makes a close sliding fit with the bore of the gun barrel which is to be rifled. The guide sleeve extends from the cutting tool 31 to the shoulder at the end of the flange 24. The clamping of the cutter 31 in place by the nut 35 serves to hold the guide sleeve 26 in place as well. Between the pilot 33 and the guide sleeve 26 the cutter is firmly held in line with its work and caused to cut the rifles evenly all around.

To still further hold the cutting tool in line with its work and insure proper cutting I provide a sleeve 51 on the end of the rifling bar, which sleeve has a limited travel on the end of the rifling bar on the left hand side of the head stock 3. In a 3″ gun this sleeve is allowed a travel of about $15\tfrac{3}{4}''$ and its length is about $1\tfrac{1}{2}''$. The sleeve is limited in its travel by means of a groove or key way 52 with which it engages with the key 53, which confines its movement forward and back along the rifling bar to the length of the key way. This key way may run straight or may run spirally parallel with the rifling groove 10. The sleeve can be removed from the left hand end of the rifling bar as shown in Fig. 2. When the cutting tool moves to the left to cut the rifles, the sleeve remains stationary so far as longitudinal movement is concerned until the end of the groove 52 reaches it, after which it moves with the rifling bar. When the cut is finished, the cutting tool will project beyond the breech of the gun and the sleeve 51 will remain in engagement with the rifles centering the rifling bar and tool with reference thereto. The rifling bar and shank between the cutting tool 31 and sleeve 51 are long enough to span the powder chamber of the gun and expose the cutter outside of the gun while the sleeve 51 remains engaged with the rifles. The sleeve 51 prevents the cutting tool from drooping or sagging in the powder chamber. When the movement of the rifling bar in the opposite direction takes place, the sleeve again remains stationary near the end of the rifles until the shoulder at the right hand end of the flange 24 engages the sleeve and carries the sleeve with it. The presence of the sleeve at or near the end of the rifles causes the flange 24 to be centered with respect to the rifles and make true engagement therewith when it enters the rifles and prevents chattering of the cutter at all times, which chattering may be due to a vibration in the rifling bar, which vibration may in turn be caused by the passing of a train, or overhead crane, or other local disturbance. The sleeve as it moves back and forth, passes over the key 18 and the cover plates 21 and 22.

The open spaces in the pilot left between the segmental guiding shoes are provided for the purpose of allowing the chips from the cutting tool to pass out through them as fast as the chips are cut off so as to leave the teeth of the tool free of obstruction during their cutting operation. The chips are carried out by the flow of the lubricating oil. Such chips as do not pass out can remain in the space between the pilot and the cutting tool, which space is made large enough to hold all the chips that may accumulate in a single cut. This space is cleaned out at the end of each cutting operation before the rifling bar is drawn back through the barrel of the gun. The short chips are readily flushed out with the oil while the long chips or ribbons accumulate to a greater or less extent in the open space between the pilot and the tool.

As each cutting tool wears, it can be ground down to the next smaller size and used over again. In this way a single large cutter would pass through all the sizes of the series and eventually become the smallest cutter and only the largest size cutter need be furnished new as each reduction in the sizes of the cutters takes place.

In operation, the barrel of the gun is first placed in the machine and properly centered therein, and the rifling bar is equipped with the shank, cutter, sleeves and pilot and made ready for use, the parts being held in place by the nut. The rifling bar with the small cutter is driven through the barrel of the gun until the cutter emerges from the far end of the gun. The chips are then wiped off and the nut, pilot and oil distributing sleeve taken off of the shank and the cutter is then removed and the oil distributing sleeve and pilot and nut are replaced on the shank, after which the rifling bar is drawn back through the barrel of the gun. Then the oil distributing sleeve and pilot are again taken off and the next larger cutter is put on the shank, after which the rifling bar is again driven through the barrel. This operation is repeated with each successive larger cutter until all twelve cutters have been used in succession, using one at a time. In a 3″ gun, each operation requires between 2 and 3 minutes, and with the passage of the last and largest cutter the rifling of the gun is completed.

As each cutter advances through the gun, the oil is turned on so it flows through the rifling bar and floods and washes the cutter, carrying away the chips. After the cutter has passed into the powder chamber, the oil is turned off and remains turned off until the cutting operation of the next cutter begins.

This application discloses the same invention as is disclosed in my prior application Serial Number 218,722, filed February 23, 1918, and contains an improvement thereon.

As will be seen from Fig. 6, the key 18 bears against the key way of the shank on the right hand side only and draws the tapered end of the shank up to a tight fit with the socket, the key making contact with the key way of the socket on the left hand side only.

I claim:

1. A rifling tool having a shank, a rifling bar capable of coupling to said shank, said bar and shank having a common key way therein, a key for fastening said shank and bar together, and a centering sleeve sliding over said key on said rifling bar.

2. A rifling tool having a shank, a rifling bar capable of coupling to said shank, said bar and shank having a common key way therein, a key for fastening said shank and bar together, a centering sleeve sliding over said key on said rifling bar, a key on said sleeve, a key way on said bar along which said key can travel and with the end of which said key engages to limit the movement of the sleeve.

3. The combination of a rifling bar, a stationary head stock and a movable tail stock supporting said rifling bar, a sleeve on said bar beyond said head stock, said sleeve having a sliding movement on said bar partially limited by said head stock in one direction.

4. The combination of a rifling bar, a stationary head stock and a movable tail stock supporting said rifling bar, a sleeve on said bar beyond said head stock, said sleeve having a sliding movement on said bar, a key way in said bar, a key on said sleeve engaging with the end of said key way to limit the movement of the sleeve thereon.

5. In a rifling machine the combination of a rifling bar having a socket in the end thereof, a shank having a tapered end engaging with said socket, a key way in said shank and bar, a key engaging therein for holding them together, and a centering sleeve on said bar mounted to slide over said key way and key.

6. In a rifling machine the combination of a rifling bar having a socket in the end thereof, a shank having a tapered end engaging with said socket, a key way in said shank and bar, a key engaging therein for holding them together, a pocket extending across the bar into which the end of the shank projects, said pocket being adapted to receive a drift for the purpose of driving the shank out of the socket, and plates for closing the ends of said pockets to form a tight receptacle therein.

7. In a rifling machine the combination of a rifling bar having a socket in the end thereof, a shank having a tapered end engaging with said socket, a key way in said shank and bar, a key engaging therein for holding them together, a pocket extending across the bar into which the end of the shank projects, said pocket being adapted to receive a drift for the purpose of driving the shank out of the socket, plates for closing the ends of said pockets to form a tight receptacle therein, and oil passage ways in said bar and said shank joined by said pocket.

8. In a rifling machine the combination of a rifling bar having a socket in the end thereof, a shank having a tapered end engaging with said socket, a key way in said shank and bar, a key engaging therein for holding them together, a pocket extending across the bar into which the end of the shank projects, said pocket being adapted to receive a drift for the purpose of driving the shank out of the socket, plates for closing the ends of said pockets to form a tight receptacle therein, oil passage ways in said bar and said shank joined by said pocket, and means for holding said plates in position on the rifling bar.

9. In a rifling machine the combination of a rifling bar having a socket in the end thereof, a shank having a tapered end engaging with said socket, a key way in said shank and bar, a key engaging therein for holding them together, a pocket extending across the bar into which the end of the shank projects, said pocket being adapted to receive a drift for the purpose of driving the shank out of the socket, plates for closing the ends of said pockets to form a tight receptacle therein, oil passage ways in said bar and said shank joined by said pocket, means for holding said plates in position on the rifling bar, and a centering sleeve adapted to slide on said bar over said key and said plates.

In testimony whereof I affix my signature in the presence of a witness.

CARL G. ALLGRUNN.

Witness:
ETHLOINE S. GREENMAN.